Figure 1:
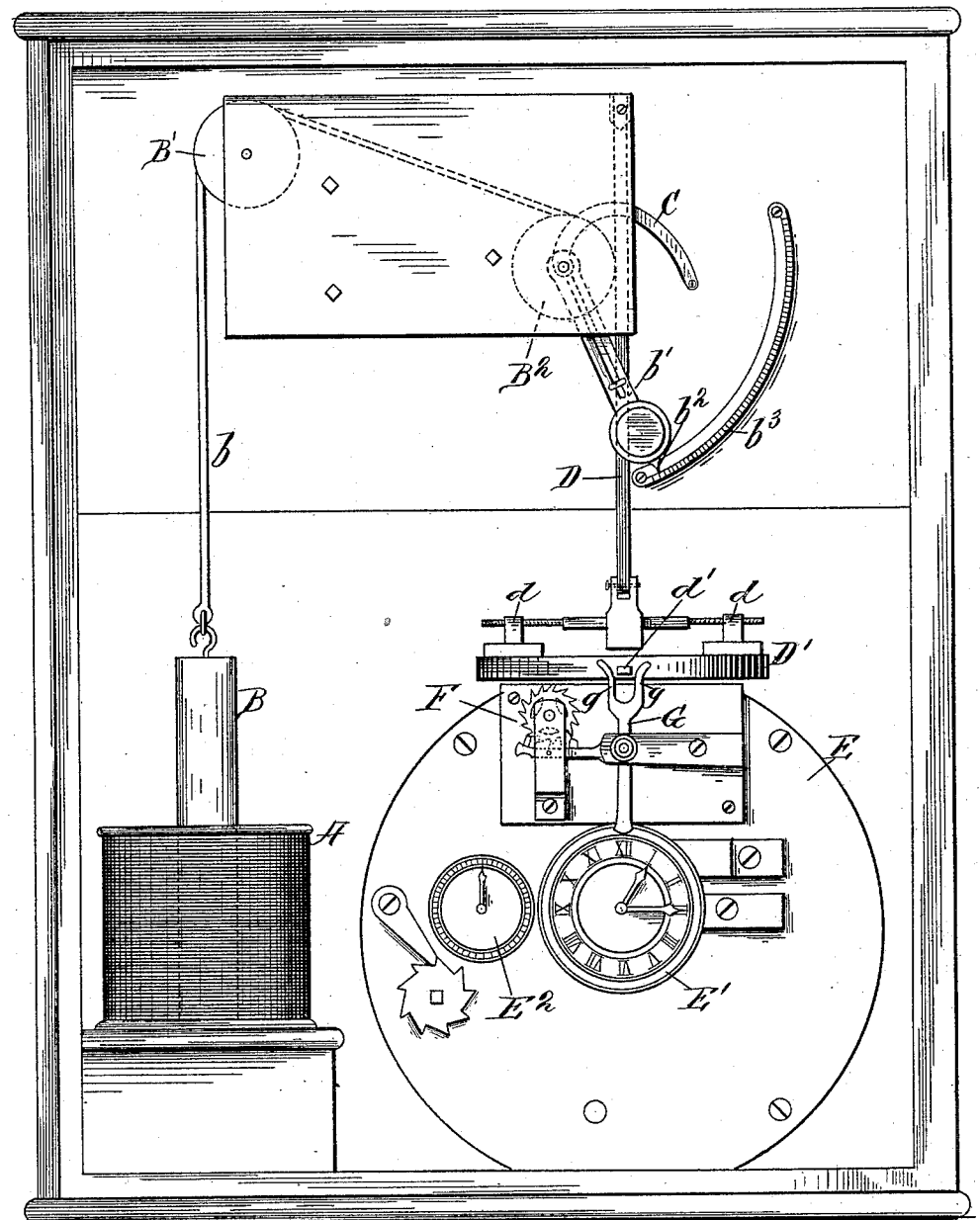

(No Model.) 3 Sheets—Sheet 1.

W. H. DOUGLAS.
ELECTRIC METER.

No. 413,038. Patented Oct. 15, 1889.

Witnesses
W. C. Coulies
A. M. Best

Inventor
William H. Douglas (No Model.) 3 Sheets—Sheet 2.
W. H. DOUGLAS.
ELECTRIC METER.
No. 413,038. Patented Oct. 15, 1889.
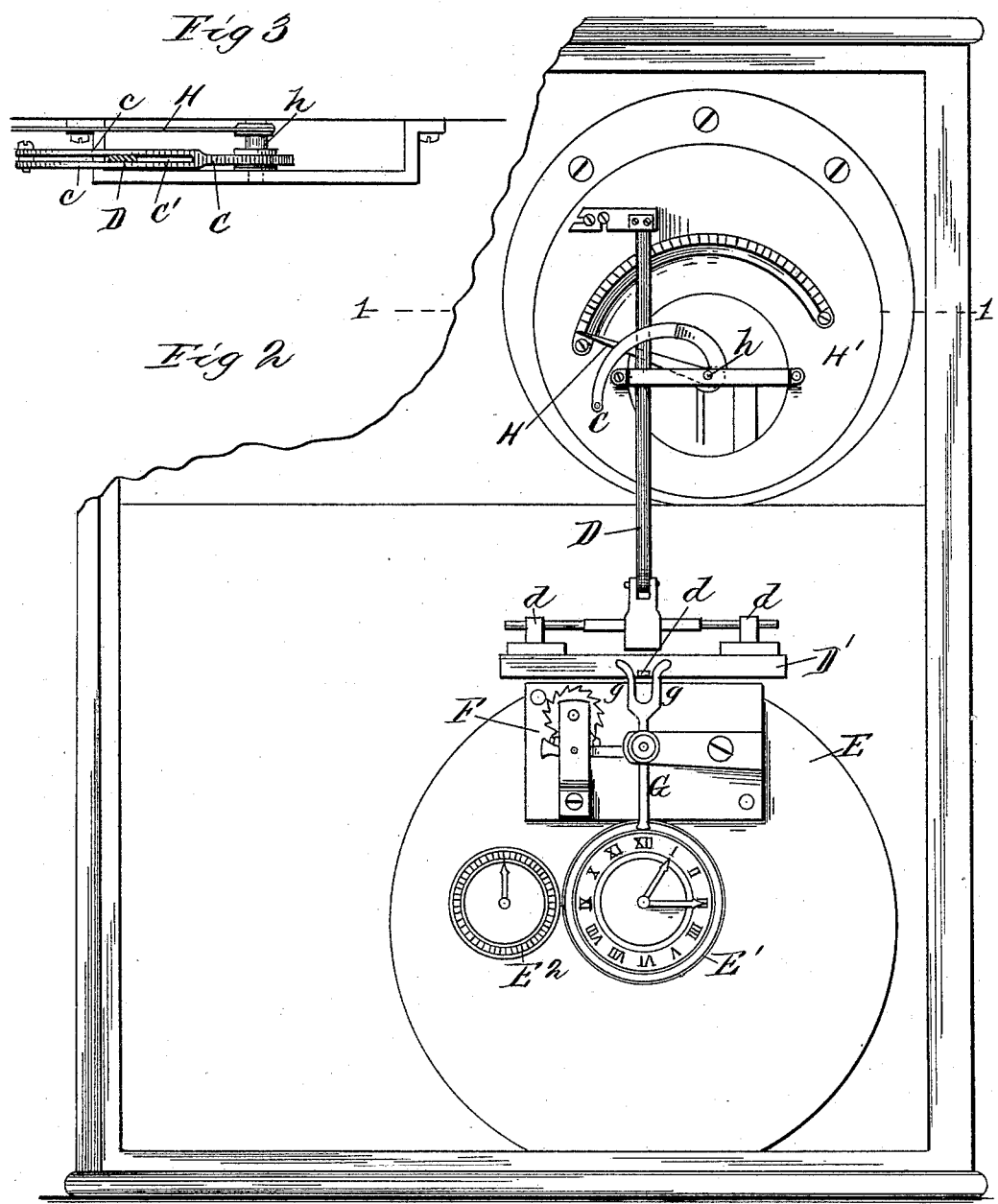

(No Model.) 3 Sheets—Sheet 3.
W. H. DOUGLAS.
ELECTRIC METER.
No. 413,038. Patented Oct. 15, 1889.
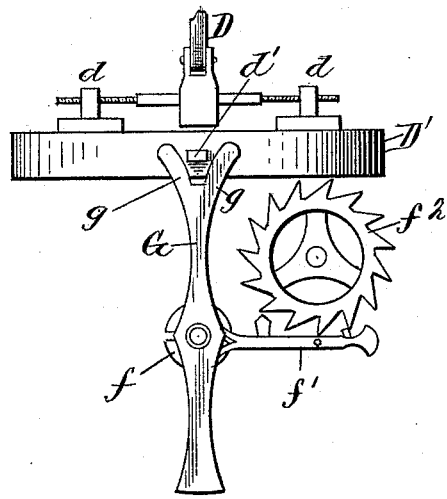
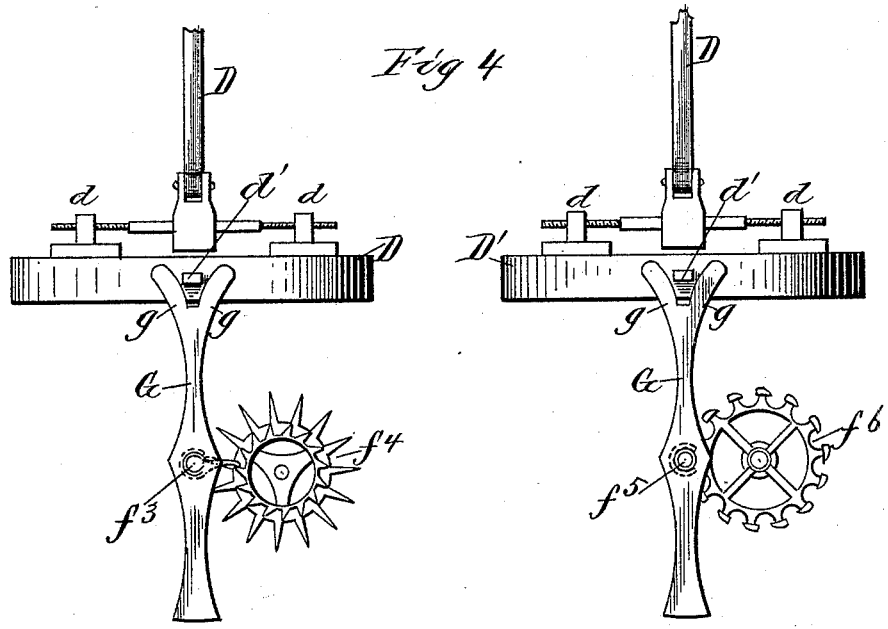
Fig 4
Fig 5   Fig 6
Witnesses  
W. C. Corlies  
A. M. Best
Inventor  
William H. Douglas  
By Coburn & Thacher  
Attys

UNITED STATES PATENT OFFICE.

WILLIAM HENRY DOUGLAS, OF STOURBRIDGE, COUNTY OF STAFFORD, ENGLAND.

ELECTRIC METER.

SPECIFICATION forming part of Letters Patent No. 413,038, dated October 15, 1889.

Application filed May 5, 1888. Serial No. 272,973. (No model.)

*To all whom it may concern:*

Be it known that I, WILLIAM HENRY DOUGLAS, a subject of the Queen of Great Britain and Ireland, residing at Stourbridge, county of Stafford, England, have invented a certain new and useful Improvement in Instruments for Measuring Electric Currents, of which the following is a specification, reference being had to the accompanying drawings, in which—

Figure 1 represents a front elevation of a construction embodying my invention; Fig. 2, a similar view showing a modification; Fig. 3, a detail sectional view taken on the line 1 1 of Fig. 2; Fig. 4, a detail elevation illustrating the embodiment of my invention when used in connection with a detached lever-escapement; Fig. 5, a similar view showing its application to a duplex escapement, and Fig. 6 a similar view showing its application to a horizontal escapement.

Like letters refer to like parts in all the figures of the drawings.

My invention relates to instruments for measuring electric currents, and has for its object to provide an instrument whereby the quantity of electricity passing through a given point or portion of a circuit during any given period of time may be accurately measured.

To this end my invention consists in certain novel features, which I will now proceed to describe, and will then particularly point out in the claims.

In the drawings I have shown in Fig. 1 one form of apparatus embodying my invention. In this construction A represents a solenoid arranged in the circuit so that the current the quantity of which it is desired to measure passes through the said solenoid. Within this solenoid there is arranged a core B, free to move vertically and suspended by means of a cord $b$, which passes over a pulley B′, and has its end connected to a second pulley B². There is also connected to this second pulley B² a weighted counterpoise-arm $b′$, provided with a point $b^2$, which indicates upon a suitable scale $b^3$ the number of ampères passing through the solenoid at any given time.

C represents a curb connected to the pulley B², so as to move therewith, and having the curved form shown, said curb consisting, as shown more particularly in Fig. 3 of the drawings, of two arms $c$, having between them a space $c′$, within which the suspension-spring of the vibratory pendulum is embraced flatwise.

D represents the flat suspension-spring of a vibratory pendulum D′, provided with weights $d$ or timing-screws, by means of which the same may be regulated. The pendulum D′ has a vibratory motion, of which the spring D is the axis, the torsional action of said spring serving to permit and assist the vibration of the said pendulum.

As hereinbefore stated, the spring D passes downward through the curb C, between the arms of which it is embraced, so that only that portion of the spring which is below the said curb is capable of twisting. It will be at once seen that as the pulley B² is rotated the curb C will be caused to embrace the spring D higher up or lower down, thereby lengthening or shortening the effective operation of said spring and correspondingly lengthening or shortening the beat of the pendulum attached thereto. The pendulum D′ is provided with a radial projection $d′$, for the purposes hereinafter pointed out.

E represents a time-piece or clock of any suitable construction, provided with a dial E′, indicating the hours and minutes in the usual manner, and with a second dial E², having its indicator connected to the clock-train by a suitable gearing and indicating the number of days which the time-piece has run. This time-piece is provided with any suitable escapement F, that shown in Figs. 1, 2, and 4 being a detached lever-escapement.

G indicates a lever attached to the escapement and actuated thereby and serving in turn to actuate the pendulum D′. In case a detached lever-escapement is employed, as shown in Figs. 1, 2, and 4, the lever G is mounted upon the roller-staff $f$ of the escapement. In this construction $f′$ represents the detached lever of the escapement, and $f^2$ the escapement-wheel.

The lever G is bifurcated at its upper end, as shown at $g$, in order to engage with the projection $d'$ of the pendulum $D'$ at each beat of the escapement, and thereby propel the pendulum and cause it to vibrate.

The operation of the instrument just described is as follows: When the curb C is so turned that the indicator $b^2$ is at zero on the scale $b^3$, the time-piece is properly regulated by means of the weights or timing-screws on the pendulum $D'$, so as to indicate correctly mean time. A current of electricity passing through the solenoid A will attract the core B proportionately to its quantity, and, acting through the medium of the cord $b$, will move the curb C, so as to lengthen the suspension-spring of the pendulum to a proportionate extent. This will of course cause the time-piece to lose in the same proportion. For example, sixty ampères passing through the solenoid per hour will be indicated on the dial $E'$ by the loss of one minute per hour from mean time, and one ampère per hour will be indicated by the loss of one second per hour. It will thus be seen that the dial E of the clock indicates, by a comparison with mean time, the amount of electricity which has passed through the solenoid, the dial $E^2$ serving to indicate the number of days the time-piece has run.

In Fig. 2 of the drawings I have shown a modified form of my invention, in which the solenoid and core and their connecting mechanism are dispensed with, the curb C being connected directly to the shaft $h$ of the indicator H of an ammeter $H'$. The remaining portions of the apparatus—to wit, the pendulum and its spring, the time-piece, &c.—are as in the construction just described, the spring D being embraced by the curb C, as shown in Fig. 3. The ammeter, being located in the circuit, serves to operate the curb in the manner hereinbefore described, and by its effect upon the time-piece to indicate the quantity of electricity passing through the circuit in any given time.

As hereinbefore stated, the time-piece E may be provided with any suitable escapements instead of the detached lever-escapement already described. For instance, in Fig. 5 I have shown the lever G attached to the balance-staff $f^3$, which is driven by the escapement-wheel $f^4$. When this duplex escapement is employed, it will be understood that the lever G strikes the projection $d'$ only at each alternate beat of the escapement.

In Fig. 6 I have shown a lever G as mounted upon the cylinder $f^5$, which is driven by the escapement-wheel $f^6$ of a horizontal escapement. No detailed description of these escapements is necessary, as their construction and operation are well known. I have simply referred to them for the purpose of showing how the lever G may be connected to each particular form of escapement.

I make no claim in the present application to the particular form of escapement herein shown and described, as the same will form the subject-matter of a separate application.

It is obvious that various modifications in the details of construction may be made without departing from the principle of my invention; and I therefore do not wish to be understood as limiting myself strictly to the precise details hereinbefore described, and shown in the drawings.

Having thus described my invention, what I claim as new, and desire to secure by Letters Patent, is—

1. The combination, with a suitable timepiece, of the curb C, for regulating the movement thereof, the pulley $B^2$, to which said curb is attached, the cord $b$, attached to said pulley, the solenoid A, located in the circuit, and the core B, suspended within the same by means of the cord $b$, substantially as and for the purposes specified.

2. The combination, with a suitable timepiece, of the pulley $B^2$, provided with curb C and counterpoise-arm $b'$, the solenoid A, located in the circuit, the core B, and the cord $b$, connected to the pulley and supporting said core, substantially as and for the purposes specified.

3. The combination, with the solenoid and core or ammeter, of a curb controlled thereby, a detached vibrating pendulum controlled by said curb, and a time-piece the escapement of which is provided with an additional lever to operate the said pendulum, substantially as and for the purposes specified.

WILLIAM HENRY DOUGLAS.

Witnesses:
HENRY F. TALBOT,
EDWARD BURTON PAYNE.